(12) United States Patent
Chalfant, III et al.

(10) Patent No.: US 8,995,841 B1
(45) Date of Patent: Mar. 31, 2015

(54) BEAM PATH ADAPTATION SYSTEM AND METHOD FOR FREE SPACE OPTICAL COMMUNICATIONS SYSTEMS

(71) Applicant: Space Photonics, Inc., Fayetteville, AR (US)

(72) Inventors: Charles H. Chalfant, III, Fayetteville, AR (US); Terry L. Tidwell, West Fork, AR (US); Michael Leary, Farmington, AR (US)

(*) Notice: Subject to any disclaimer, the term of this patent is extended or adjusted under 35 U.S.C. 154(b) by 61 days.

(21) Appl. No.: 14/024,748

(22) Filed: Sep. 12, 2013

Related U.S. Application Data

(60) Provisional application No. 61/700,079, filed on Sep. 12, 2012.

(51) Int. Cl.
*H04B 10/00* (2013.01)
*H04B 10/11* (2013.01)

(52) U.S. Cl.
CPC .................................. *H04B 10/11* (2013.01)
USPC ............................ 398/122; 398/119; 398/131

(58) Field of Classification Search
USPC .............................. 398/119–123, 131
See application file for complete search history.

(56) References Cited

U.S. PATENT DOCUMENTS

| | | | |
|---|---|---|---|
| 5,465,170 A * | 11/1995 | Arimoto | 398/129 |
| 6,195,044 B1 * | 2/2001 | Fowell | 342/367 |
| 6,535,314 B1 * | 3/2003 | Mendenhall et al. | 398/121 |
| 6,668,184 B1 * | 12/2003 | Kleiman | 600/422 |
| 7,860,344 B1 * | 12/2010 | Fitzpatrick et al. | 382/291 |
| 2007/0031151 A1 * | 2/2007 | Cunningham et al. | 398/131 |

* cited by examiner

*Primary Examiner* — Dzung Tran

(57) ABSTRACT

A system and method in the field of free space optical communications (FSOC) for overcoming atmospheric-induced spatial optical signal variations operates within each of two FSOC terminals that make up a bi-directional FSOC link, with each terminal providing the rapid adaptive beam path method over a much wider field of view than typically used for adaptive optical techniques. Each terminal uses a real-time adaptive beam-steering technique that continuously measures optical power and optical power gradients by the receiver optical detectors; this data is sent to a control system that automatically responds by re-aligning the optical system accordingly by maximizing the optical signal power measured by the optical power receiving detector.

10 Claims, 11 Drawing Sheets

Locked-on link in good atmosphere

Atmospheric turbulence causes the beam to (spatially) wander

The transmitter must alter its pointing angle to compensate for the beam wander in real time.

BEAM PATH ADAPTATION SYSTEM AND METHOD FOR FREE SPACE OPTICAL COMMUNICATIONS SYSTEMS

CROSS-REFERENCE TO RELATED APPLICATIONS

This application claims the benefit of U.S. provisional patent application No. 61/700,079, entitled "Beam Path Correction System and Method for Free Space Optical Communications Systems," filed on Sep. 12, 2012. Such application is incorporated herein by reference in its entirety.

BACKGROUND OF THE INVENTION

The present invention relates to the field of optical wireless communications, also referred to as Free Space Optical Communications (FSOC). FSOC systems are today employed in military, civil, and commercial applications. An FSOC system generally consists of a set of two transmitting terminals and receiving terminals. A transmitting terminal transmits an optical signal generated by a (presumably electronic) source that converts electrical signals to optical signals for transmission out of the transmitting telescope. The receiving terminal receives the incoming optical signal into a receiving telescope, which focuses the signal into an optical focal plane for coupling into a photodetector, which converts the light energy into an electrical signal.

Pointing and steering of optical beams that either enter or exit from the focal plane of a telescope is typically carried out via motorized beam steering mechanisms, such as gimbals, mirrors or other techniques that guide the beam through the telescope from the focal plane to the optical detection circuit and from the optical transmission devices. Maintaining accurate alignment of the beam is essential for FSOC systems. This alignment requires fast responses to changes in the beam path and beam quality deriving from a range of sources including atmospheric effects and base mount motion. In order to account for beam perturbations due to atmospheric effects, very high angular positioning resolution and bandwidth is required in order for the receiver telescope to efficiently collect the incoming optical beam regardless of atmospheric conditions.

Conversely, the transmitter telescope must be able to quickly and accurately adjust the pointing of its beam so that it continuously remains directed onto a receiving terminal for detection by the terminal's photodetector. Changing atmospheric conditions will cause the optimal transmission angle to change with time even if both terminals are completely stationary. Thus a real-time control system is needed to sustain said optimal transmit/receive angle regardless of changing atmospheric conditions.

What is desired then is a beam tracking and pointing system that improves upon the accuracy and speed of existing tracking and pointing systems by providing high bandwidth and high angular resolution, and an associated control system to provide for rapid adaptation of the optical beam trajectory to compensate for changes in optical beam trajectory caused by variations and perturbations in the atmosphere, so that the light collecting apparatus in the FSOC focal plane receives a maximum optical power at all times and in all atmospheric conditions. The desired control system and beam steering devices would desirably possess the correct beam steering frequency response and optical intensity tracking response in order to provide an adaptable beam path to improve the optical intensity tracking capability.

References mentioned in this background section are not admitted to be prior art with respect to the present invention.

BRIEF SUMMARY OF THE INVENTION

The present invention is directed to a laser tracking apparatus and method that provides optimal beam pointing and tracking throughout arbitrary atmospheric conditions and perturbations. The present invention achieves very fast beam tracking and pointing response times and provides optimized angular pointing and tracking trajectories while transmitting high data rate communications.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Beam-steering solutions may include gimbals, fast steering mirrors, acousto-optics, liquid crystals, electro-optics, micro-optics, galvanometer or magnetic mirrors, and micromirror arrays. A specific beam-steering technique is fast focal plane translation. Fast focal plane translation is disclosed in one or more of U.S. Pat. Nos. 8,160,452, 7,612,317, and 7,612,329, which are incorporated herein in their entirety by reference.

Beam pointing and tracking control devices generally comprise beam steering devices including but not limited to (a) an optical fiber in the center of a focal plane (either mirrored focal plane or not) of the FSOC telescope with the fiber (and/or mirror) attached to translational stages that move said fiber and/or reflecting mirror in the focal plane of the transmitting and receiving optical systems in response to changes in the angle of arrival of an incoming optical beam, (b) steering mirrors that direct the beam within the FSOC telescope to a stationary optical detector in the center of the FSOC focal plane, and (c) electro-optical beam steering devices such as acousto-optical, nonlinear optical, configurable diffraction creating liquid crystal arrays and other beam steering devices. The beam pointing and tracking Field of Regard (FOR), more specifically the horizontal and vertical angular fields over which the FSOC system can point and track the beam, provides the beam control domain over which such systems may active adapt the optical path between terminals in response to atmospheric effects including beam fading, turbulence, scintillation and all other effects, such as mounting base motion, that change the dynamics of the beam's propagation through the air.

Figure 1:
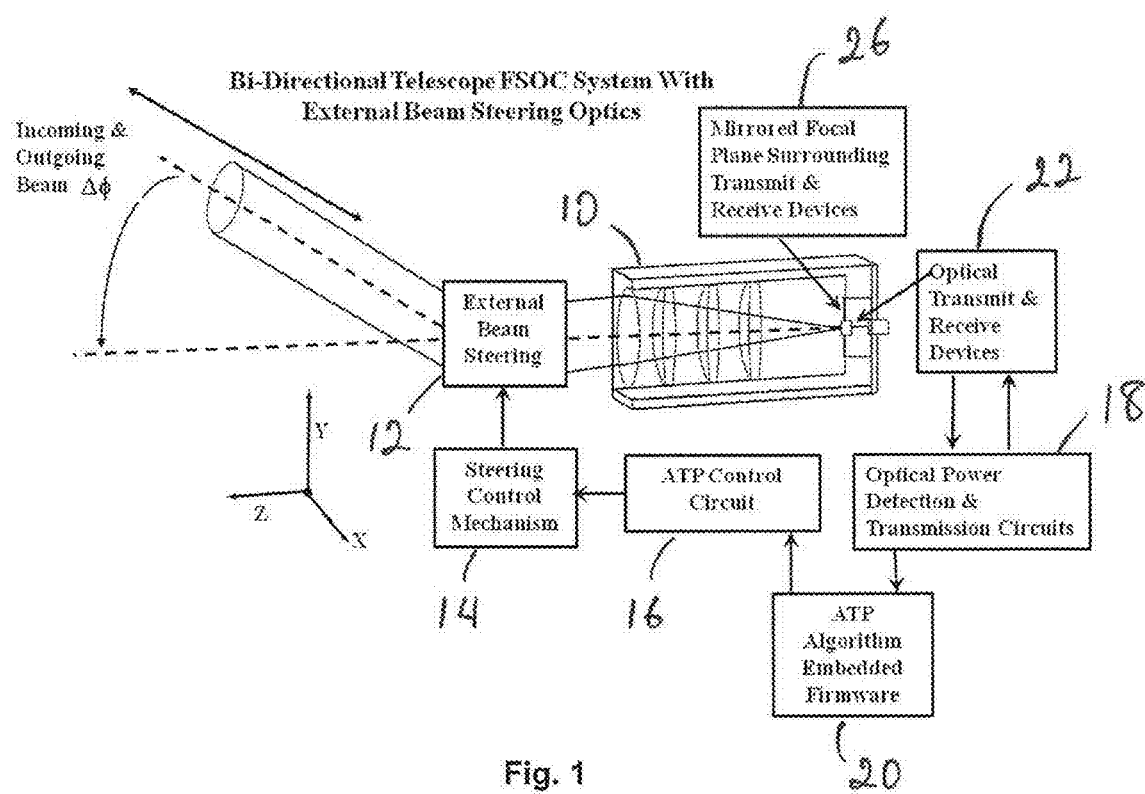
FIG. 1 is an illustration of a bi-directional telescope FSOC system with external beam steering according to a preferred embodiment of the present invention. This external beam steering can be used with the present invention with its ability to provide a relative position scan over the focal plane of the telescope.

At least three different opto-mechanical FSOC systems may be utilized, in conjunction with the control system described below, in the preferred embodiment of the present invention. First, as depicted in FIG. 1, a free space optical communications (FSOC) system may comprise an external beam steering device, (a mirror, beam splitter, or other steering device) 12 that directs the optical beam incoming from various angles into and in line with the focusing telescope 10 in the direction that focuses the optical power into the telescope's focal plane. The mirrored focal plane 26 reflects an incoming beam back along the exact path by which it arrived, thereby providing the incoming beam's remote transceiver with the exact location of its target, allowing for the link to be locked and synchronized by the beam steering control system 14 according to a preferred embodiment of the present invention.

Figure 2:
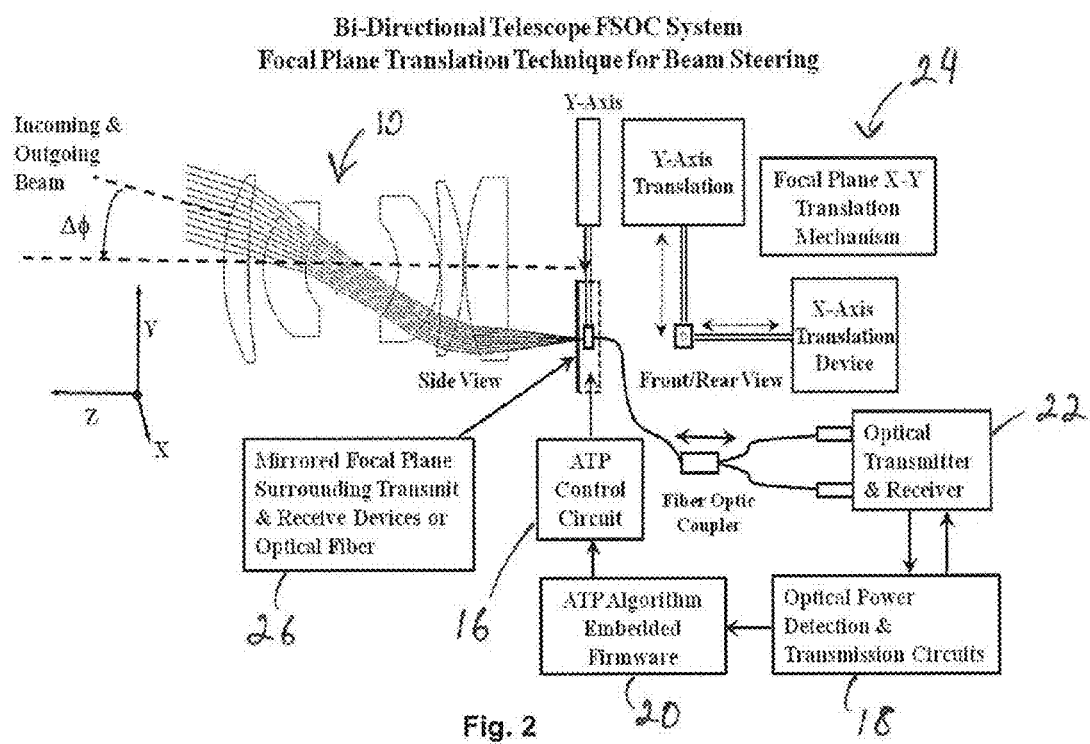
FIG. 2 is an illustration of a bi-directional FSOC system with internal beam steering apparatus using a translating focal plane containing transmitting and receiving devices located at the surface of the focal plane. The movement of the focal plane provides the position scan of the devices relative to the beam's focal spot in the focal plane. This focal plane translation is a preferred embodiment of the present invention.

With reference to FIG. 2, a second type of FSOC system utilizes a beam steering technique that directs the optical beam incoming from various angles onto the focal plane of the telescope 10. This system thus uses internal beam steering rather than an external device. The translating focal plane 26 responds to the focal plane X-Y translation mechanism 24 to move the centered optical fiber to the position in the focal area that corresponds to the input angle.

Figure 3:
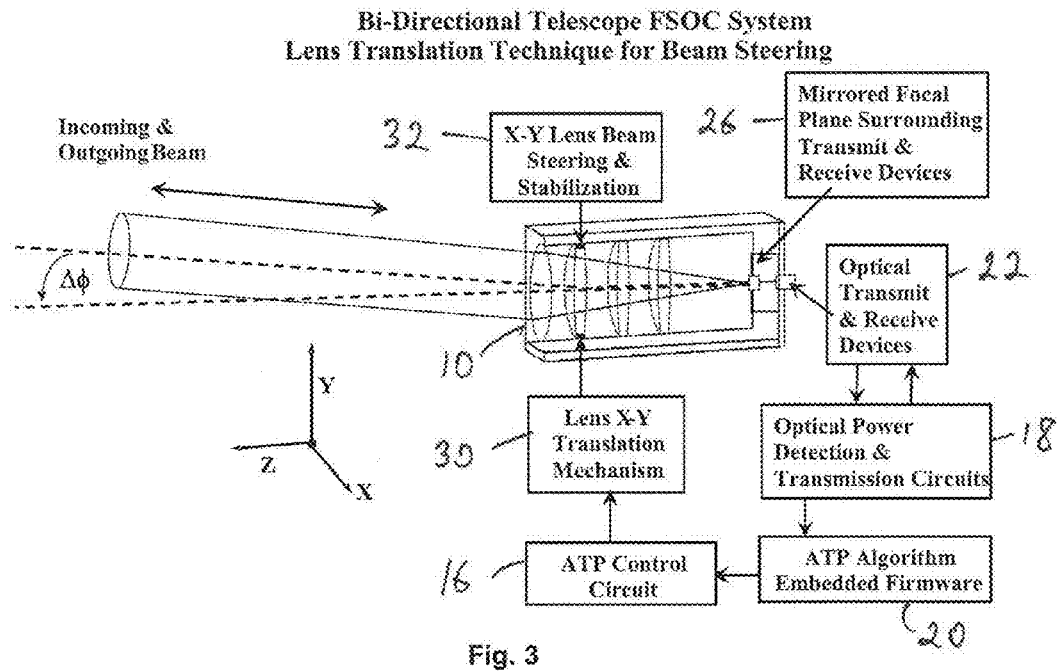
FIG. 3 is an illustration of a bi-directional FSOC system employing lens translation (movement) technique for shifting the beam's directions thereby providing a beam steering technique and the ability to scan the relative positions of the peak optical intensity at the focal plane and the position of the optical transmitting and/or receiving devices located in the focal plane of the telescope. This beam steering technique is also a preferred embodiment of the present invention.

With reference to FIG. 3, a third FSOC system comprises a telescope that contains a lens element that is interconnected with translation actuators to shift the lens in response to varying incoming angles at X-Y Lens Beam Steering and Stabilization element 32 such that the telescope focal spot is shifted in the X and/or Y direction. This is a lens adjustment type of FSOC system. The adjustment is controlled by the Lens X-Y Translation mechanism 30, and shifts the spot into the focal area where either an optical fiber or a receiving optical detector is located.

The preferred embodiment includes an optical system consisting of beam expansion and collimation optics within telescope 10 when in transmission mode, which is also a focusing optical design in receive mode, and that also provides a reflection of the incoming optical signal exactly in the reverse direction of said incoming signal any time that said incoming signal is incident on the receiver optics, as described herein. The preferred embodiment further includes fiber optics, a mirror 26 in the telescope focal plane, and fast translational stages that move the mirror and optical fiber throughout the entire focal plane, which can be of a wide range of sizes, from as small as a few square millimeters up to many square centimeters, depending entirely on the application and the required field of regard. The preferred embodiment is operable to generate and send a laser signal into the transmitter fiber, through the fiber optic coupler (or circulator) and transmitted out of the optical fiber in the focal plane of the telescope. The direction of the exit beam is determined by the optical system and the X-Y position in the focal plane. Conversely, an incoming beam is focused at a specific spot in the focal plane depending on its arriving angle. The preferred embodiment contains the various transmit, receive, acquisition, and tracking control electronics necessary for operation of the transceiver, which preferably are contained in a remote electronics bay. These include optical transmit and receive devices 22, optical power detection and transmission circuits 18, an acquisition, tracking, and pointing (ATP) control circuit 16, and ATP algorithm embedded firmware 20. These electronic components provide control of the required azimuth and elevation range of motion and tracking slew rate translation devices to track and point the incoming and outgoing optical beams. Although certain preferred embodiments are described herein with respect to FSOC systems, the invention is not limited to communications applications, and in fact may be put to many other logical applications as will be apparent to those skilled in the art.

The preferred embodiment utilizes a single telescope 10, with optical noise isolation being accomplished by a high-quality optical coupler with low reflections, or an optical circulator that provides extremely low feedback reflection due to its unique design. As with most free space optical transceiver systems, the preferred embodiment is equipped with optical filters (not shown) in order to filter out optical noise. The optical lens design focuses the optical energy into the focal plane of receiver telescope 10, and transmits the optical transmitter in the required direction. This is due to the transmitter and receiver sharing a fiber optic coupler or circulator that minimizes optical noise and allows the transmission and reception to traverse the shared fiber optic coupler and optical fiber. It may be noted that any selected communications band in any of the optical domains may be utilized; however, in the preferred embodiment optical filtering is utilized, providing narrow-band optical intensity, and thereby providing low-noise signal detection.

In various opto-mechanical configurations as set forth in FIGS. 1-3, a preferred embodiment is shown with the incoming received beam and outgoing transmitted beam in an example configuration. The configuration shows the angular direction of the beams with respect to the relative position of the transceiver telescope. The received signal arrives from a remote transmitter or target. The received signal arrives in an expanded form, such that only a portion of received signal is actually captured by the receiver telescope aperture and focused by the receiver focal plane through a receiver lens system. The received beam angle of arrival determines the location of the focused spot at the receiver focal plane, as shown.

As already described, received beam angle of arrival determines the coordinates of the receiver focal plane at which the optical energy will be focused. The receiver/transmitter optical fiber is then moved such that its end is aligned with that location on focal plane, which as already explained is the location at which the optical energy is focused. The optical fiber thus can receive the light energy being directed upon the focal plane in this position. A change in focal plane positions may represent either a different remote transceiver terminal or a new relative location of a remote transceiver with respect to the transceiver location. Because of the change in location, the translation stages will move the optical fiber to this corresponding new location in the focal plane of the telescopes. The system accepts the received signal arriving from a remote transmitter and focuses that portion that enters the optical fiber focal plane location through the receiver lens system. The telescope transmitter/receiver optical fiber is then moved such that its end is aligned with the receiver focal plane at which the optical energy is focused. The transmitter optical fiber, being the same as the receiver, automatically retransmits a beam in the direction of the transmitter. Thus the transmitter is automatically set to emit a transmitted signal that is directed toward the source of the received signal.

Figure 4:
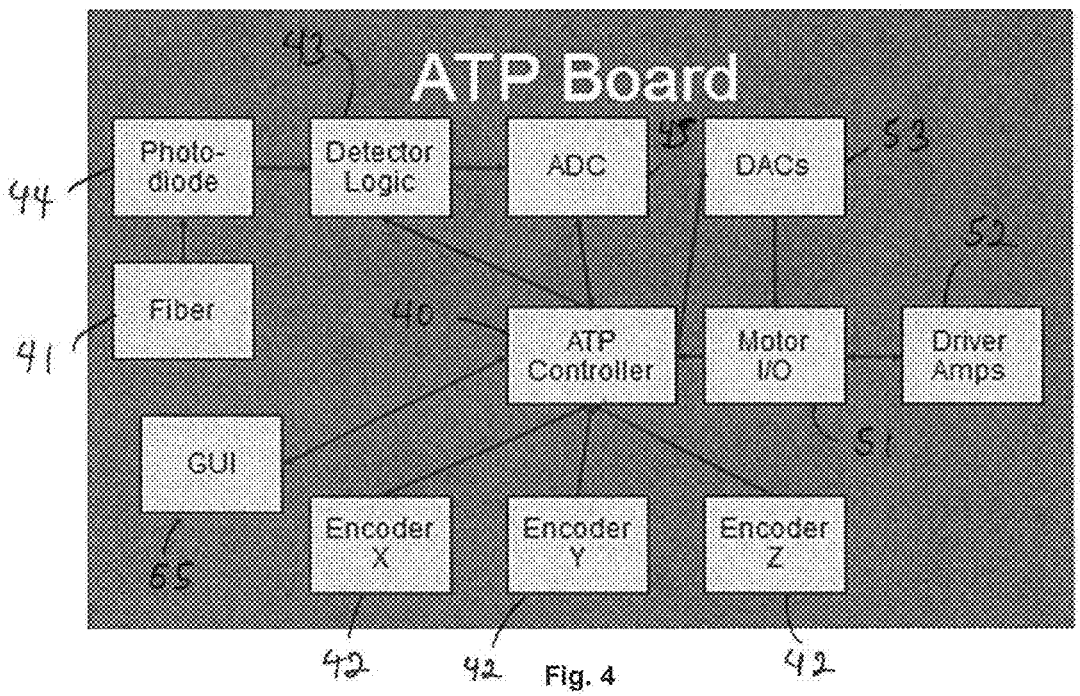
FIG. 4 is a diagram of a preferred embodiment of a circuit board for an acquisition, tracking, and pointing (ATP) control system. It is a general depiction of a preferred embodiment of the various electronic components and modules needed for a bi-directional FSOC system with active beam steering and ATP.
Figure 5:
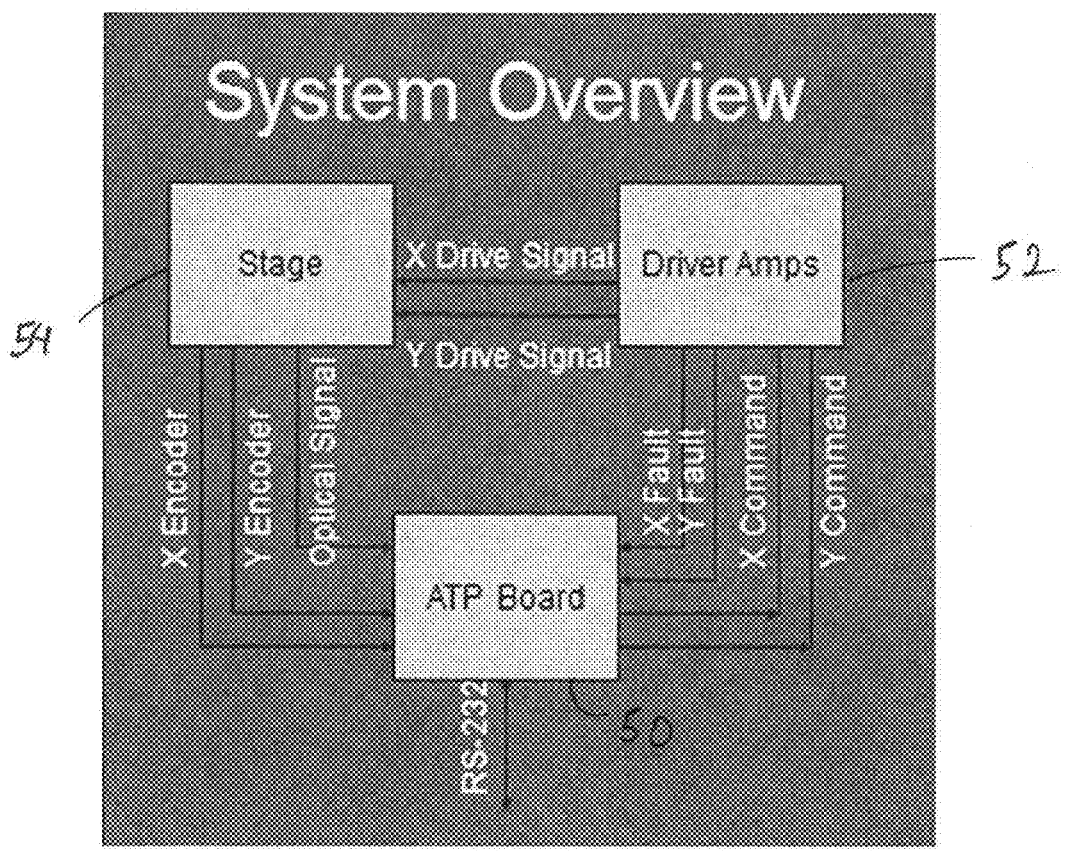
FIG. 5 is an overall diagram depicting a preferred embodiment of a bi-directional FSOC system with active beam steering including mechanical components, showing the flow of control operations.

A control system may be implemented to manipulate the translation devices in accordance with the preferred embodiment of the present invention, as depicted in FIGS. 4 and 5. ATP board 50 communicates with driver amps 52, which in turn provide X-direction and Y-direction drive signals to stage 54. Encoders (not shown) provide X- and Y-direction position information from stage 54 to ATP board 50, as well as the received optical signal. In FIG. 4, the logical arrangement of ATP board 50 is more particularly illustrated. ATP controller 40, preferably implemented as a microcontroller of which many known types are known in the art, receives encoder information from blocks 42. Fiber 41 passes signal data to photodiode 44, which by means of detector logic 43 detects the optical signal, which is then converted to a digital signal by ADC block 45 in order to be used by ATP controller 40. X– and Y– direction drive signals are processed from ATP controller 40 by use of DAC 53, motor I/O 51, and as noted above, driver amps 52. A graphical user interface (GUI) 55 allows for monitoring of processing at ATP controller 40.

Figure 6:
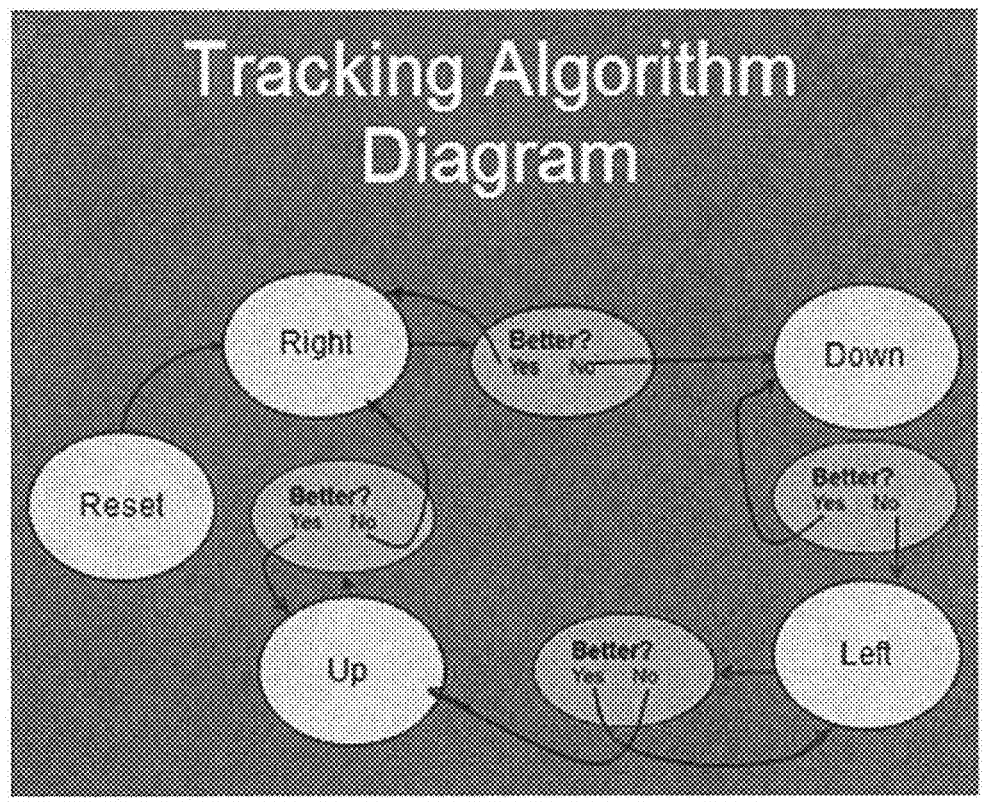
FIG. 6 is a diagram depicting the fundamental steps needed for a gradient scan tracking control system, including gradient scan, smoothing, averaging, and decision making/prediction according to a preferred embodiment of the present invention.

The function of tracking in the X and Y directions is generally shown in the control loop depicted graphically in FIG. 6, which is preferably based upon a maximization of the optical power collected by the receiver version of the optical fiber, and thereby the transmitter of the optical fiber, since the transmit and receive source are the same. Various such algorithms are known in the art; however, the preferred embodiment of the current invention is directed to optimizations specific to acquisition, tracking, and pointing (ATP) controllers, as shown in FIG. 6. In the preferred embodiment, such a control system may be implemented as programming within a microprocessor in communication with the transceiver system.

With reference now to FIG. 6, a tracking algorithm according to a preferred embodiment of the present invention may now be described. When an incoming beam is detected with the coarse scan (i.e., the general acquisition algorithm), a procedure is implemented to locate the precise center of the beam power in the center of the fiber optic cable aperture. This consists of moving to the "latch" (latched within 5 ns of trip signal) position and then implementing a simple algorithm stepping in the x and y (and possibly z) directions as long as the signal power is increasing (known as "sequential lobing" or "random walk"), and stopping at the first point of decrease. At this point the process is repeated with a larger excursion value (move distance) around the "max-power" point. This is repeated until the entire "spot" has been sufficiently profiled (found a "below the acquisition threshold" point on all sides) and it is thus known where the real center is. The max-power value is then stored for future use with the tracking algorithm. It may be noted that this approach is still employing the fiber positioning stage only, just at lower speed than the search algorithm. In addition, peak detection may need to continue beyond this point.

The power-centering algorithm can be used for continuous tracking with rapidly fluctuating "on-the-move" applications such as the formation-flying cluster application, but is generally not recommended for long distance links because the continual motor reversals produce undesirable dynamics and lower effective motion resolution resulting in pointing errors that get multiplied over the link distance. These, however, are not significant for short links. Also, the sequential lobing (one axis at a time) approach allows redundancy of the power electronics, as further explained herein. An example of a power centering control system according to a preferred embodiment of the present invention is given below with explanations for each command.

Any tracking application consists of, at the highest level, two issues: Defining the feature that will be tracked, and defining how to track it. Note that both of these may change over time. In the example case of single sensor optical signal tracking, optimal tracking bandwidth (BW) requires movement towards the peak without changing directions (e.g., maintain velocity in the gradient tracking direction) unnecessarily. This is because the time spent accelerating and decelerating the stage is very prohibitive to fast operation. Also, the physics of static friction makes it very undesirable to stop a translation increment when it is not necessary to do so. The reason for this is that the transition from the static to the dynamic friction regime when the axis is restarted causes an overshoot event.

Figure 7:
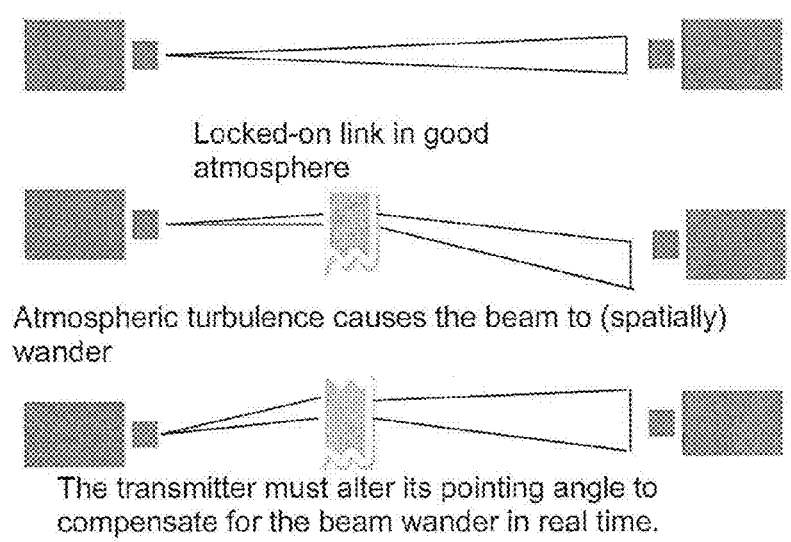
FIG. 7 is a diagram illustrating beam wander caused by atmospheric turbulence.
Figure 8:
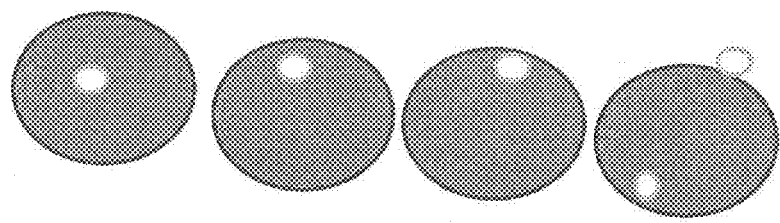
FIG. 8 is a diagram illustrating beam scintillation caused by atmospheric turbulence.

Atmospheric effects include attenuation and fades (absorption, backscatter, diffraction), scintillation (periodic breaking up of the beam spatially), and beam wander (changes in beam path due to variances in refractive index along the path). FIG. 7 depicts how a beam may change directions or fade; FIG. 8 illustrates how a beam may "skip" around from scintillation effects. Atmospheric attenuation does require that a sufficient amount of power be launched to overcome it; however, it is believed by the inventors that the preferred embodiments of the present invention as described herein reduce the required power necessary in order to adequately address these atmospheric effects.

When atmospheric fades cause a reduction in the photosignal intensity, the ATP controller must know that this is actually a fade and not movement of one or both terminals (i.e., a change in pointing direction is needed). With single sensor tracking systems, this requires a complete gradient scan. That is, an excursion must be made in all directions to determine that the signal did not improve in any direction. Once this determination is made, the peak signal that the system is "looking for" must be decremented so that if the beam does move, it may be tracked (otherwise the system would always be looking for a better signal than the one before the fade).

Beam wander is a fairly low frequency event and can usually be "tracked through" with a high-bandwidth ATP system as presented in connection with the preferred embodiment. Beam wander is graphically depicted in FIG. 7.

Scintillation presents the biggest challenge to FSOC. One must understand the nature of a "roiling" beam and manage it stochastically. The beam dropouts can occur at high frequency but are very localized. An intensity peak will move (roil) from a nucleation point across the FOR and then "die," as depicted in FIG. 8. Thus they can be temporarily "tracked" but the challenge is to quickly re-establish on another peak when they dissipate. More importantly, stochastic relationships exist that dictate when to stop tracking a roiling peak and move to the predicted (nucleation) point where the next "good signal" is (all this occurs on the order of a millisecond). During this transition, data is stored and then forwarded with a "burst" when the link is re-established. The nucleation point will be at or near that of the previous roiling peak. However, the nucleation point will also move across the FOR over time, and thus it must also be tracked for optimum performance.

In general, for single sensor gradient tracking, both terminals must move in the "correct" direction at the same time in order for either terminal to "see" an improvement Optimal efficiency is obtained by starting gradient scans in the direction that has produced a better signal more often lately (even if that's the direction that just rendered a worse signal, triggering the start of this "new" gradient scan) to maximize the chance that both terminals will move in the correct direction at the same time. When one terminal sees a better signal, it implies that the other terminal did as well, causing both terminals to re-center at the same time. This produces a certain synchronization of the gradient scan initiation between the two terminals. If the scans were started in two directions such that when one terminal moves in the "right" direction, the other terminal is moving in the "wrong" direction (1 in 12 chance), this synchronization will cause the terminals to simply repeat the gradient scan over and over, and nominally stay in the same position (i.e. not tracking at all). However, this synchronization can be used to advantage. If, for example, when terminal A was moving in X+ direction and terminal B was moving in Y– direction and has produced the "best" results lately, then either X+/Y–, Y+/X+, X–/Y+, or Y–/X– is the most likely combination to produce a positive result. Starting with any of these combinations ensure that the system will proceed through all of them. Thus starting both terminals' scans at the same time and in the direction that has produced the best results lately produces the greatest likelihood that compatible scan directions will be produced even if it is not the initial directions that the terminals start in. In addition, this adds a certain amount of predictive tracking component to the tracking algorithm.

Figure 9:
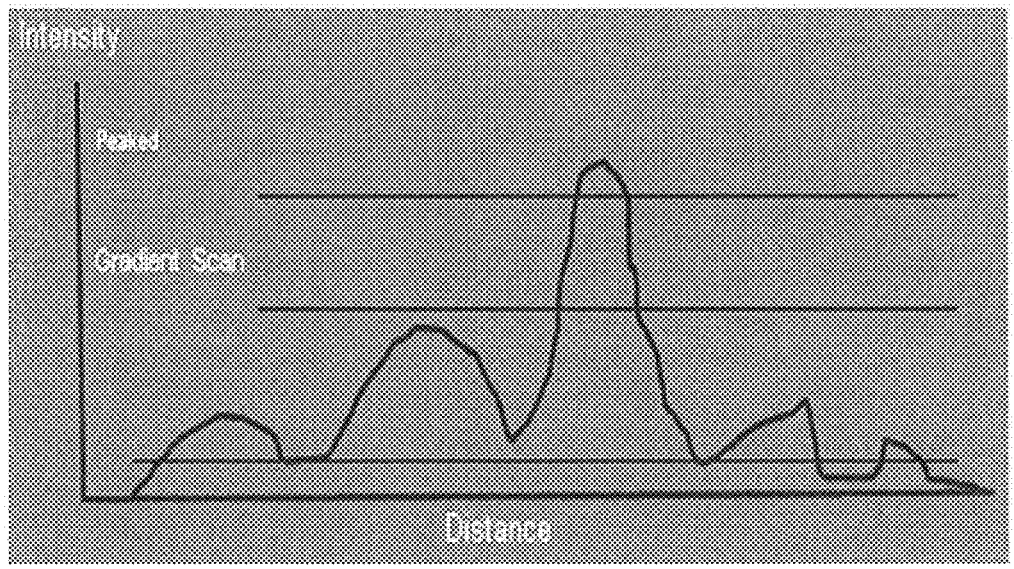
FIG. 9 is a depiction of a typical beam optical power profile across a cross-section of the telescope focal plane where the optical intensity spot is centered. The lines across the profile show examples of threshold value settings that are used for gradient scan tracking algorithm reference.
Figure 10:
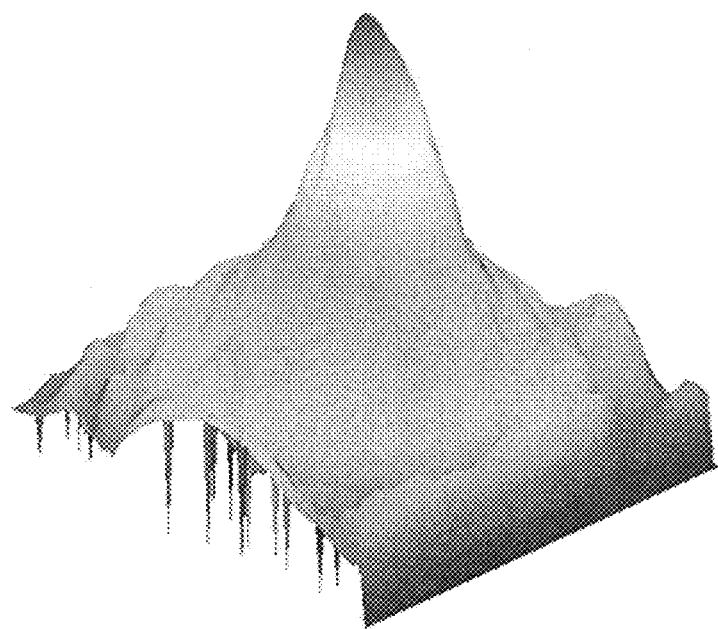
FIG. 10 is a depiction of a typical beam intensity across the entire (two dimensional) telescope focal plane. This drawing gives an example of storing data points in two dimensions at the ATP control as gradient scans are made to construct a model of the beam for use with data smoothing and predictive decision making.
Figure 11:
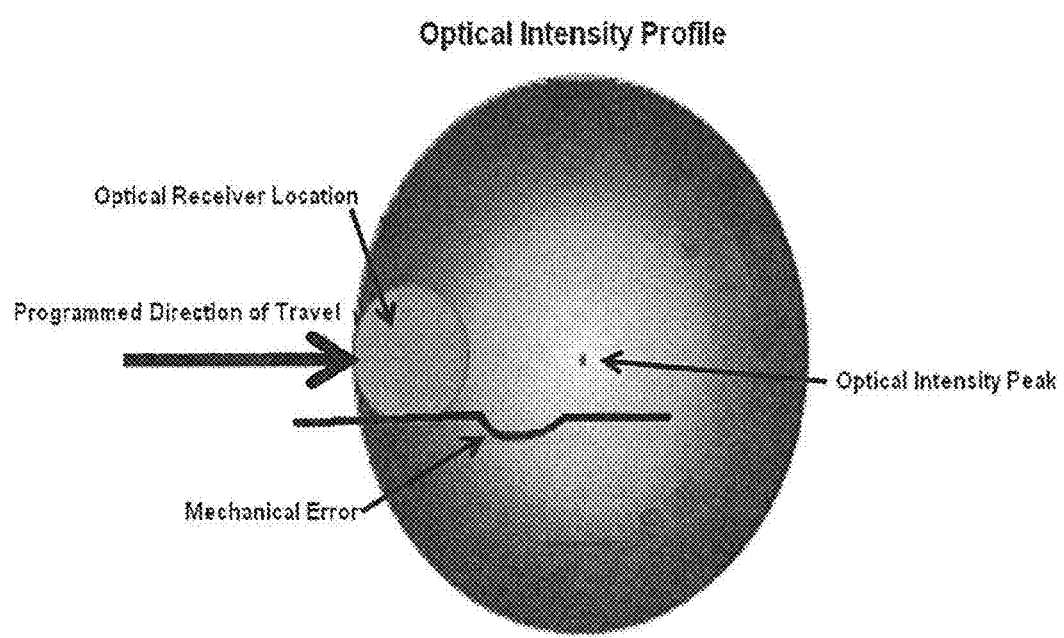
FIG. 11 is a diagram illustrating a mechanical defect and its effect on scanning location data collection; the illustrated optical receiver location prior to encountering the defect shows the optical receiver's traversal as the optical intensity scan progresses.
Figure 12:
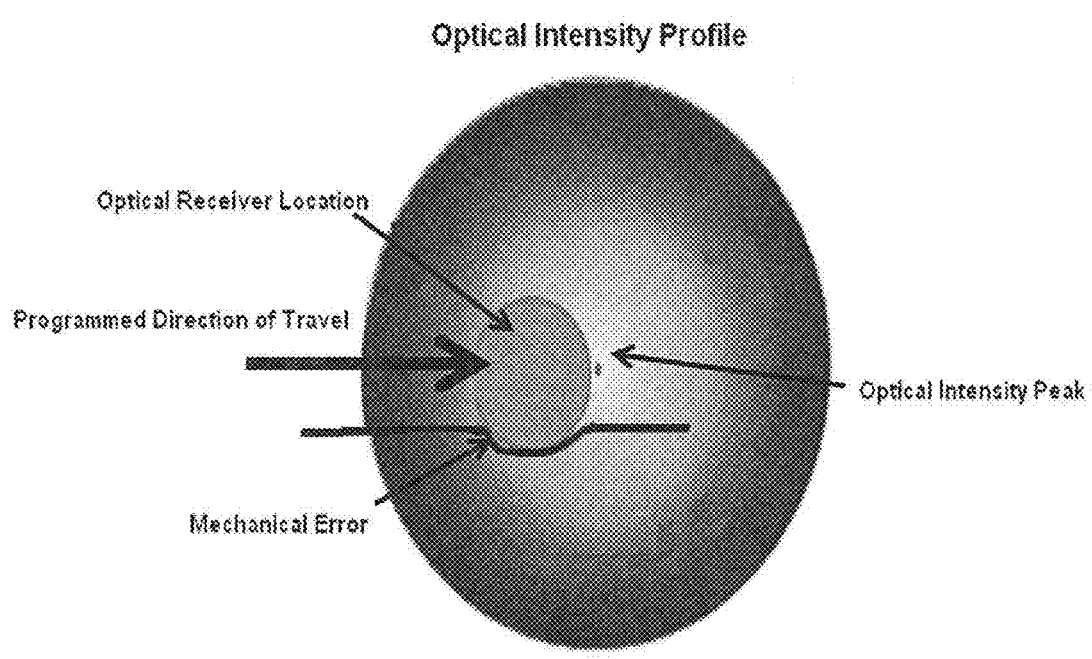
FIG. 12 is a diagram illustrating mechanical defects with an illustrated optical receiver location shown as it encounters a mechanical error as it traverses and scans the optical intensity.
Figure 13:
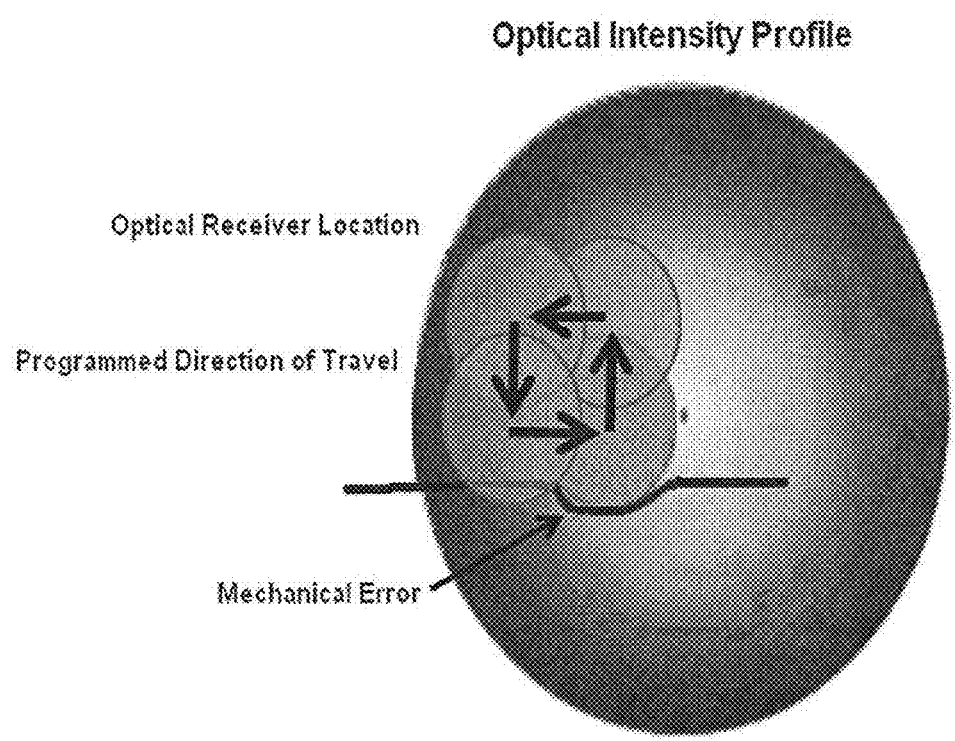
FIG. 13 is a diagram illustrating algorithm mitigation response to mechanical defects to tracking accuracy and bandwidth with an illustrated optical receiver shown in its automatic gradient scan triggered by a detected mechanical defect.
Figure 14:
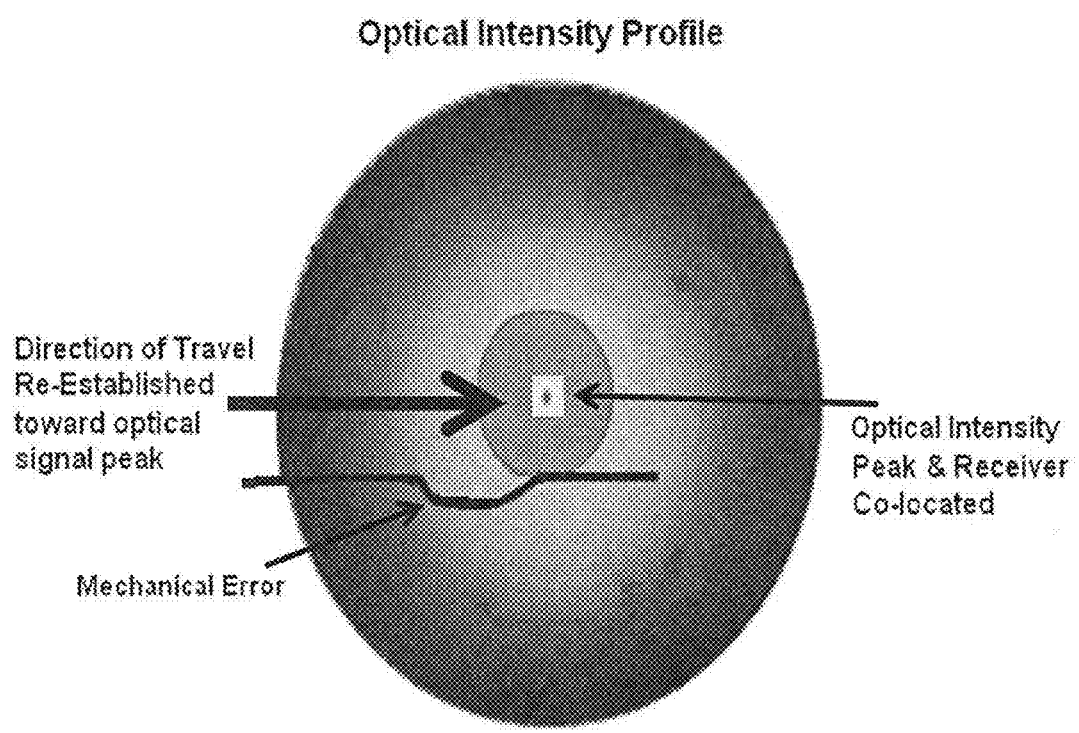
FIG. 14 is a diagram illustrating the second order algorithm mitigation of mechanical defects with an illustrated optical receiver continuing on its path after encountering mechanical error and ultimately centering with the signal peak.

FIG. 9 illustrates a typical cross-section of a focused beam spot in the focal plane of an FSOC telescope. The plot of data points show that in a single gradient scan direction, the optical power profile will possess minor local signal peaks, with a single primary high power signal peak in the center of the optical power profile. The preferred embodiment described herein locates and centers the optical alignment of the detector device on the primary highest power signal peak. FIG. 10 shows a two-dimensional gradient scan, with similar smaller signal maxima, and a much larger primary signal peak; this peak is aligned and centered upon using the two dimensional data optical power measurements. In FIG. 9, the two lines represent threshold settings that are used as reference points or settings to trigger incremental alignment steps during the search for the primary high power signal peak.

A distinction should be made with the adaptive beam path invention herein with a state-of-the-art optical process known as adaptive optics (AO). AO measures an optical power profile then directly modifies the optical phase fronts within the optical system. The resulting optical intensity profile is therefore improved actively by optical elements increasing and decreasing the relative optical paths or phase fronts within unfocused optical plane(s). The resulting optical intensity profile in the telescope's focal plane is therefore actively controlled and improved using slow moving elements such as deformable mirrors or partitioned piston-mounted mirrors. The limitation to this technique is that you are forced to utilize only the entrance optical aperture's field of view, which is fixed and restricted. This means that AO can only correct or improve optical signals that enter its fixed aperture. The adaptive beam path method according to the preferred embodiment described herein can operate over a very wide field of view, or more specifically referred to as field of regard (FOR). Preferred embodiments have been demonstrated with FOR's of 30 degrees in the X axis and 30 degrees in the Y axis from a single FSOC telescope simultaneously. AO techniques cannot improve the collection of optical power if fading and scintillation effects move the beam outside the telescope's field of view. The adaptive beam technique presented here can follow, track, and adapt to fading and other beam variations that fall well beyond the field of view range of all state-of-the-art FSOC and AO systems' field of view.

It may be understood that this gradient scan approach also allows for the ability to possibly overcome a mechanical detent in the gradient direction, as illustrated in FIGS. 11-14. In other words, if a mechanical error causes a deflection of the stage in a direction other than the commanded direction, this may result in an optical signal reading that is erroneous (due to the off-axis deflection). That is, if the stage had not deflected, the signal would have continued to improve. Thus we want to continue in this direction but the system has no way to know this. This can work to cause the tracking to move to the edge of the beam where the slope of the photosignal is steep due to the decrement function.

If an encoder line is noisy, a situation can occur where the controller thinks that the gradient scan movement in the "improving" direction has already occurred when the stage hasn't actually moved. Obviously the controller will not see an improvement and so will command a change in gradient scan direction. If the application is in a very noisy environment, care must be taken to notice if an excursion is completed repeatedly in a given direction without a command signal having been sent to the motor.

According to the preferred embodiment, any time a photosignal reading that is "Max Power Buffer" greater than the "last best" is received, the system is configured to re-center and continue in that direction, maintaining accrued speed. This is the desirable outcome, unless the reading was a "false reading" resulting from noise fluctuations. Common problems encountered and their solutions are set forth as follows:

Problem 1: any time the algorithm is in a "low slope" area of the intensity profile where a "Max Power Buffer" increase is not received in a given excursion in the "right" direction, the system will "make a gradient scan box" instead of continuing movement in the right direction. Further, it will continue in the dither box until a random change causes it to move on. Thus it is desirable not to make the Max Power Buffer parameter any higher than necessary to be above the random noise.

Problem 2: anytime a spurious signal that is "Max Power Buffer" bigger than last best is received, the system will move one more excursion and then go into a gradient box (even though it is moving in the right direction) because it will not see another sample that is "Max Power Buffer" bigger than the spurious signal. It will continue in the dither box until last best decrements enough for us to continue on. Both of these problems can work to make the system track on the "edge" of the beam where the photosignal has a steep slope.

An example approach written in pseudocode that incorporates these features is set forth below:

```
While(!done) //start sequential lobing tracking
{
for(i=1;i<=num_tries;i++) //number times to average photosignal
{
   acsc_GetAnalogInput(Handle, 0, &Photo_signal[i], NULL);
//sample photosignal
   Photo_signal[0]+=(Photo_signal[i]); //take average of multiple readings . . . noise check
}
Photo_signal[0]=int(Photo_signal[0]/num_tries);
diff=-(float(Photo_signal[0])-float(old_photo_signal));
   //change since last pass
if(fabs(diff)>Ki[2]) //if the signal has changed enough to warrant doing something
{
if(better<=-1) //if it got worse going both directions . . .
{
   better=1; //reset the flag
peaked++;//count the number of axis changes since last lock
   if(j==0) j=1; // then change axes, 1=y, 0=x
   else j=0;
DaVoltage[1]=n[j]/abs(n[j])*
(Max_voltage+Photo_signal[0]*10/max_photo_voltage);
   // //establishes //initial command voltage with preferred polarity. goes to zero at max //possible photo signal
}
   else if(diff<0.) //signal got worse the first time
{
   better--;
   DaVoltage[1]=-DaVoltage[1];//change direction by reversing voltage
}
//else it got better, so don't change anything
err=AO_VWriteChannel(cardID, j, DaVoltage[1]); // turn the j axis on n[j]+=int(DaVoltage[1]); // establish preferred direction so we know best way //to go at axis change
if(Photo_signal[0]<-2000){// its locked so don't force it to move; just monitor
   acsc_GetRPosition(Handle, j, &Rpos[j],NULL); // encoder position
peaked=1;//reset peak oscillation counter
else //we need to try to get a better signal
while(fabs(Rpos[j]-start_pos[j])<Kp[2]*peaked)//minimum distance to move
   acsc_GetRPosition(Handle, j, &Rpos[j],NULL);// monitor position old_photo_signal=Photo_signal[0];
   //set comparison flag
   if(Photo_signal[0]<max_photo_voltage)//achieved new power max;
adjust
   //command voltage formula
   max_photo_voltage=-2000; //reset max power flag
} //end if signal changed
AO_VWriteChannel(cardID, j, 0.0); //turn the axis off
//if(Photo_signal[0]<-3750)done=1;//for continuous tracking, comment this line out
} //end while not done
```

The preferred implementation of the Acquisition, Tracking, and Pointing Auto-reacquisition software for PC-based ATP systems employs a number of critical things specific to "small spot" tracking. For example, since both resolution and tracking bandwidth is needed, it must calibrate the null offsets (per axis and per direction) precisely. This can only be performed in a "tracking mode." That means that either a constant, or better yet, a random background photosignal must be used to make sure that no drift occurs over time. Even more important is to make sure that no momentary drift occurs on loss of signal. Perhaps the most critical task is to make sure the system does not oscillate on a false peak (side lobe, etc). This requires that either a known photosignal intensity threshold is surpassed guaranteeing that it is on the main peak, or a mapping (sequential lobing is sufficient) of the entire spot must occur to determine this threshold. Also, with a system that is mechanical bandwidth limited, one can improve tracking bandwidth slightly by starting the search sequence in the axis and direction that has produced the most peaks "lately." This is because, in general, the relative motion of the target terminal is biased in one direction.

It will be recognized by those skilled in the art that the preferred embodiment as described herein offers a number of advantages over existing acquisition systems. Perhaps the greatest advantage of this fiber-in-the-focal-plane approach to ATP is the inherent ability to rapidly acquire a target terminal over a large pointing angle. This is possible because the preferred embodiment locks onto the target terminal the first time its optics is swept by the transmitting terminal, regardless of how it is moving its transmitted beam (i.e., the target terminal may be searching simultaneously). Due to the design of the optics, a mirrored focal plane will return the incident beam in the same trajectory as it had incoming, regardless of where it is focused in the focal plane. Thus the transmitting terminal will see its own back reflection when it sweeps the target terminal. It then simply locks onto its own back reflection and waits for the target terminal to do the same, at which time the link will be established.

The preferred embodiment of the present invention does not require a more powerful laser or separate optics for the search beacon as opposed to the communications system. Because the mirror is in the focal plane of the receiver optics, it reflects all of the incident light on the optics back through the optics, which re-collimates the back-reflected beam as well as sending it back along the incoming path. This means that for a typical optical antenna efficiency of 66%, fully 44% of the intensity will make it back to the transmitting terminal. The level of optical intensity needed for detection will always be lower than 44% of the intensity needed for high data rate communications, so the communications system is always sufficient for the acquisition process. Furthermore, the preferred embodiment is completely passive and does not add significant cost, power consumption, or size/mass to the system.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the following claims.

The invention claimed is:

1. A method for optical beam path tracking and adaptation in a free-space optical communications system comprising a telescope, an optical signal receiving device positioned in a focal plane of the telescope, a translation device configured to move the relative position of an optical signal peak spot and the optical signal receiving device in the focal plane, and an acquisition, pointing, and tracking (ATP) controller in communication with the translation device, the method comprising the steps of:
 a. executing, using the translation device, an initial gradient scan in at least the X and Y directions to find an incoming optical signal;
 b. aligning, using the translation device, the optical receiving device with a first observed optical signal peak of the incoming optical signal as initially observed coarse tracking data;
 c. storing at the ATP controller a maximum peak location and maximum peak value correlated to an X-Y location in the focal plane and power of the first observed optical signal peak; and
 d. executing, at the translation device, an incremental X and Y stepping scan to determine if the optical signal changes in strength by a set value in the vicinity of the first observed optical signal peak, and if the optical signal power does not increase over the set value in at least two step increments from the first observed optical signal peak, continuing the scan in a different direction while maintaining the maximum peak location as the original signal peak location, but if the optical signal strength increases in a direction, then continuing scanning motion in that direction, and storing the increased optical signal strength and location as a new maximum peak location and maximum peak value as initially observed fine tracking data.

2. The method of claim 1, further comprising the step of aligning the optical receiving device, using the translation device, by continuously moving a center point of the scan to a newly detected peak location, wherein the alignment process comprises conducting X-Y scans in a vicinity of the currently recorded maximum peak value relative to the focal plane of the telescope in at least one of the positive-X, positive-Y, negative-X, or negative-Y directions at increments of a programmable step while measuring optical signal power, and changing directions once the optical signal power decreases.

3. The method of claim 2, wherein the step of executing an initial gradient scan with the optical receiving device is performed a plurality of times, further comprising the step of storing at the ATP controller the optical signal strength of data points from the scans from the plurality of measurements, and wherein the step of storing in the ATP controller a maximum peak optical power value comprises the creation of a mapped profile representing a nominal optical signal strength at the first observed optical signal peak location and its surrounding area.

4. The method of claim 3, wherein the step of executing an incremental X and Y stepping scan comprises the steps of continuously scanning the adjacent area of a previous peak optical signal with the optical signal receiving device until a new peak is detected, then scanning the adjacent area of the new peak; and providing a continuously updated X-Y profile of the optical signal in the focal plane of the telescope in the positive-X, positive-Y, negative-X, and negative-Y directions, while ensuring that the optical signal is continuously optimized at the optical signal receiving device.

5. The method of claim 4, wherein the step of aligning the optical signal receiving device comprises the steps of moving and aligning the optical signal peak with the receiving device according to the maximum power location in the focal plane, wherein the relative direction of movement between the optical signal peak and the optical receiving device is chosen algorithmically according to programmed logic that may cause an override to the step of changing directions once the optical signal decreases in strength.

6. The method of claim 5, wherein if the step of aligning the optical signal peak with the receiving device in the focal plane of the telescope does not result in a detected increase in the optical signal strength, then again moving the relative positions of the peak optical signal and the optical signal receiving device in at least one of the positive-X, positive-Y, negative-X, and negative-Y directions at increments of the defined programmable step until the optical signal increases in strength, and stopping the scans once the optical signal decreases in strength.

7. The method of claim 6, wherein the step of again moving the relative position of the peak optical signal and the optical signal receiving device in the focal plane of the telescope in at least one of the positive-X, positive-Y, negative-X, or negative-Y directions in increments of the defined programmable step for so long as the optical signal increases in strength comprises the step of only continuing if the optical signal increases in strength by at least a programmed optical signal strength threshold.

8. The method of claim 7, wherein the step of aligning with the optical signal receiving device further comprises the step of, after detecting a decrease in optical signal strength, mechanically moving the receiving device, using the translation device, in at least one of the positive-X, positive-Y, negative-X, or negative-Y directions at increments of the defined programmable step in a second direction, and if this step also results in a decrease in optical power detected, then after the two incremental steps in two different directions have detected decreases in the optical signal strength from the original signal peak, moving the receiving device in the focal plane in a third incremental step in a third direction, wherein if this step also results in a decrease in optical strength detected, then moving the receiving device in the focal plane in a fourth incremental step in a fourth direction, and further wherein if a decrease in optical strength is again detected, replacing the maximum peak value stored at the ATP controller with a reduced value.

9. The method of claim 8, further comprising the step of determining at the ATP controller a pattern of the motion of the optical intensity peak and predicting an optimal time and location to discontinue tracking a moving peak, moving the optical signal receiving device to a pre-determined predicted location based on a new predicted maximum peak optical power, the prediction based on data stored at the ATP controller, and beginning to track a new peak.

10. The method of claim 9, wherein if repeating such incremental steps until a decrease in optical strength is detected produces a reduction of signal strength in a same location indicating a mechanical defect in that location, producing an override command from the ATP controller to the translation device to continue moving the optical signal receiving device in the current direction.

* * * * *